March 26, 1968   J. W. MAIS   3,374,758
SILICON CONTROLLED RECTIFIER CIRCUIT ARRANGEMENT
FOR SEWING MACHINE DRIVES
Filed May 26, 1965
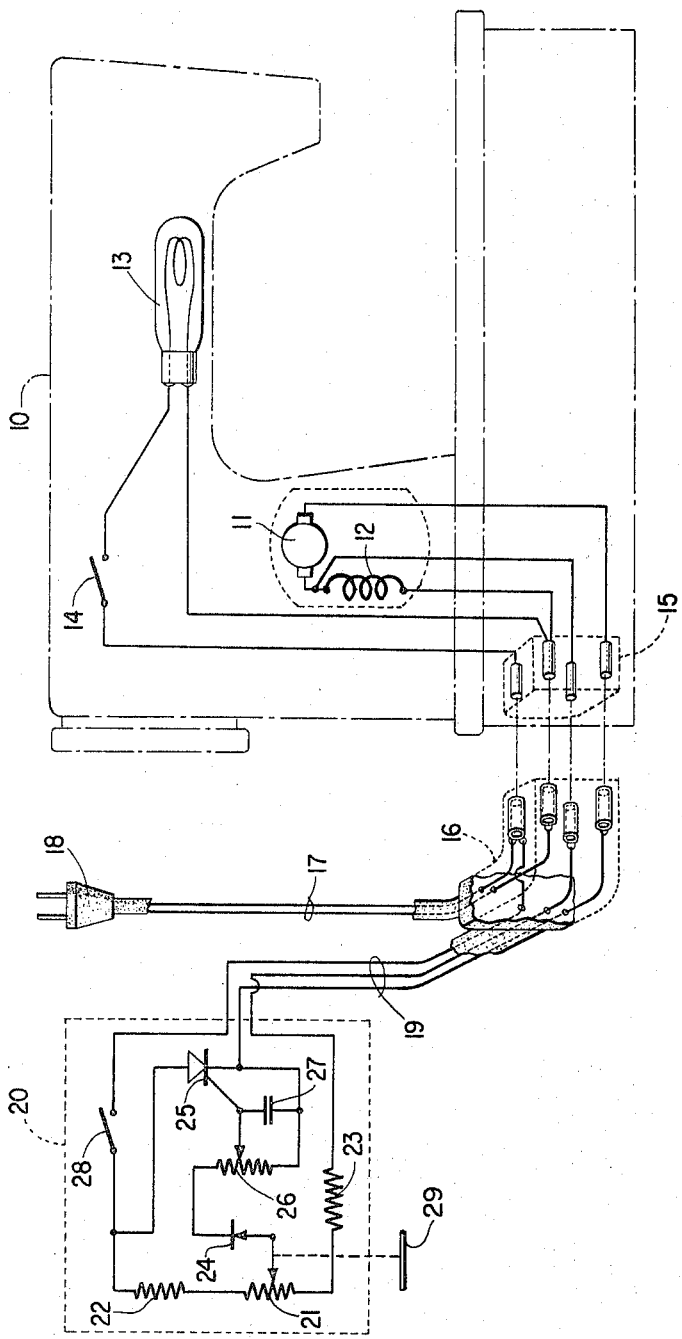
WITNESS
Nicholas Leozozak
INVENTOR.
James W. Mais
BY
Marshall J. Breen
ATTORNEY United States Patent Office 3,374,758
Patented Mar. 26, 1968

3,374,758
SILICON CONTROLLED RECTIFIER CIRCUIT ARRANGEMENT FOR SEWING MACHINE DRIVES
James W. Mais, Weehawken, N.J., assignor to The Singer Company, New York, N.Y., a corporation of New Jersey
Filed May 26, 1965, Ser. No. 458,857
1 Claim. (Cl. 112—220)

The present invention relates to the physical arrangement of electric circuit elements for controlling and regulating the speed of electric motors driving sewing machines.

It has been suggested that the fixed circuit components for manually controlling and automatically regulating the speed of sewing machines may be built into the sewing machine along with the electric driving motor itself. This is shown, for example, in the prior U.S. Patent No. 3,141,429, assigned to the same assignee as the present invention.

The prior art arrangement of placing the circuit components within the sewing machine frame has produced undesirably wide variations in the controller travel versus speed characteristics due to uncompensated tolerance variations in the controller itself. This resulted in poor low speed control or in adversely limiting the top speed.

It has been found, according to the present invention, that certain simplifications and performance advantages are obtained if the fixed circuit components are built into the foot controller element itself rather than into the sewing machine frame.

These advantages come about substantially because a single three-terminal impedance or trim adjusting potentiometer may now be used to compensate for tolerance variations in all circuit components actually used, including the variable resistance control element which formerly was a separate remote element and could not therefore be so compensated.

It is therefore an object of this invention to provide an arrangement of electrical circuit elements for controlling and regulating the speed of electric motors driving sewing machines so that the combined effect of the normal tolerance variations of the circuit components may be effectively compensated by a single adjustment or by a selected component during assembly to produce uniformity in the characteristic of controller travel versus speed for a specific production line of sewing machines.

With the above and other objects in view as will hereinafter appear, the invention comprises the arrangement of parts set forth in the accompanying drawing of a preferred embodiment of the invention from which the several features of the invention and the advantages attained thereby will be readily understood by those skilled in the art.

Referring to the single figure of the drawing, which is a diagrammatic showing of an arrangement of circuit elements or components embodying the invention, 10 denotes the frame of a sewing machine containing the usual stitch forming and feeding instrumentalities (not shown) and an electric driving motor having an armature winding 11 and a field winding 12.

Also contained within the frame 10 may be a sewing lamp 13 with a switch 14 for controlling it.

A four-terminal electrical receptacle 15 is secured to the frame 10 and is electrically connected to the motor and lamp as shown.

A four-terminal plug 16 is adapted to be connected to the receptacle 15. The plug 16 is wired to a two-conductor line cord 17 which terminates in a plug 18 receivable in an ordinary electrical wall receptacle (not shown) for supplying a source of A.C. voltage. Also connected to the plug 16 is a three-conductor cord 19 which is permanently wired to a foot controller 20 which may be placed conveniently to the sewing machine by the operator for controlling the speed thereof.

The controller 20 is unusual in that it contains, in addition to the customary operator-adjustable resistance 21 actuated by external member 29, other electrical circuit components which supply an automatic speed-regulating function to the motor. A foot controller of this type is shown and described in the copending U.S. Patent application Serial No. 494,703 filed October 11, 1965, to which reference may be had for a more complete understanding thereof.

The other electrical circuit components may include fixed resistors 22 and 23, a diode 24, a silicon controlled rectifier 25, a three-terminal impedance device 26 (preferably an adjustable trim potentiometer), and a fixed capacitor 27 electrically connected as shown. While many different circuits may be used here, the specific circuit configuration shown is described in the U.S. Patent No. 3,302,088, issued January 31, 1967, and assigned to the same assignee as the present application. A switch 28 may be used to remove voltage from the circuit in the non-operative condition of the controller 20.

Specific attention should be drawn to the fact that the trimmer potentiometer 26 is actually a three-terminal impedance device rather than a two-terminal adjustable resistance shunting the control terminals of the controlled rectifier 25 as is customary in the prior art. It will be seen from the circuit disclosed that operator-adjustable means 21 controls the firing voltage for the controlled rectifier 25 and that this voltage is impressed across the entire potentiometer resistance 26 which is connected as a voltage divider to apply an *adjustable portion* of the firing voltage to the control terminals of the controlled rectifier 25. In this manner compensation is made for the differing gate sensitivities of the controlled rectifiers 25, which must be tolerated as a practical matter. It has been found that this use of three-terminal potentiometer 26 results in better compensation of component tolerances than obtained by any other singly adjustable unit with respect to its effect on establishing a standard response characteristic for the controller. This is probably due, in part at least, to the better impedance match between the internal control impedance of the rectifier 25 and the driving circuit supplying the firing voltage.

It is, of course, necessary that the controller 20 be a standardized production item capable of interchangeable use in combination with a given standard line of sewing machines. Formerly, with the circuit elements, except for the speed-setting element, mounted in the sewing machine itself, it was found impossible to make a foot controller as a practical production item which would be fully interchangeable in the field. That is to say, each foot controller had to be adjusted or tailored to each sewing machine in order to insure the proper speed response of the combination; a situation which could not be tolerated.

In casting about for a solution of this problem it was found that, since the speed setting element was a circuit element *separate* from the rest of the circuit components, its tolerance variations could not be effectively compensated by any practical adjustment of the other circuit components. However, by placing all the circuit components, including the speed-setting element, in one package, in accordance with this invention, differences in actual individual component values, including that of the speed-setting element itself, can be compensated with respect to their combined effect on the speed performance of the circuit as a whole by adjusting a single trim potentiometer 26 in the foot controller 20, or by selecting a three-terminal impedance of proper value, to obtain a standard response characteristic.

The term "standard response characteristic," as used in this specification, means a specified curve of motor speed as a function of travel of the speed-setting element when the controller is connected to a standard motor and load.

Thus, with the circuit arrangement of this invention, each foot controller may now be factory adjusted at a single point as a final assembly step to produce the same specified performance with relation to a standard motor and load. This means that the controller becomes a production item capable of interchangeable use. Further, the specified tolerances of the individual components can be less strict resulting in savings in the cost of manufacture and improved uniformity of product.

Having thus described the nature of the invention, what I claim herein is:

1. In combination, a sewing machine, an electric motor driving said sewing machine, a controller positioned externally of said sewing machine, a plurality of electrical circuit elements mounted in said controller, detachable means for electrically connecting said circuit elements to said motor and to a source of voltage, said elements including a silicon controlled rectifier having control terminals, an operator-adjustable means controlling the firing voltage for said rectifier to control the motor speed over a desired range of speeds and a three-terminal pre-set trim potentiometer having two of its terminals connected directly to the respective control terminals of said rectifier to form a voltage divider for applying a pre-set portion of said firing voltage to the control terminals of the rectifier in order to provide circuit compensation for the combined effect of the tolerance variations in said circuit elements such that said operator-adjustable means is effective over the desired speed range.

References Cited

UNITED STATES PATENTS

| Re. 25,203 | 7/1962 | Momberg et al. | 318—246 |
| 1,792,816 | 2/1931 | Chason | 112—217.4 |
| 3,209,228 | 9/1965 | Gawron | 318—345 |
| 3,225,280 | 12/1965 | Happe et al. | 318—246 |

FOREIGN PATENTS

| 242,179 | 10/1962 | Australia. |

OTHER REFERENCES

Gutzwiller, "A Plug-In Speed Control for Standard Portable Tools and Appliances," G.E. Application Note 201.1, January 1962, 2 pgs.

JORDAN FRANKLIN, *Primary Examiner.*

H. HAMPTON HUNTER, *Assistant Examiner.*